April 16, 1963
A. McILHENNY
3,085,590
FLOW CONTROL VALVE
Filed Feb. 15, 1960          2 Sheets-Sheet 1
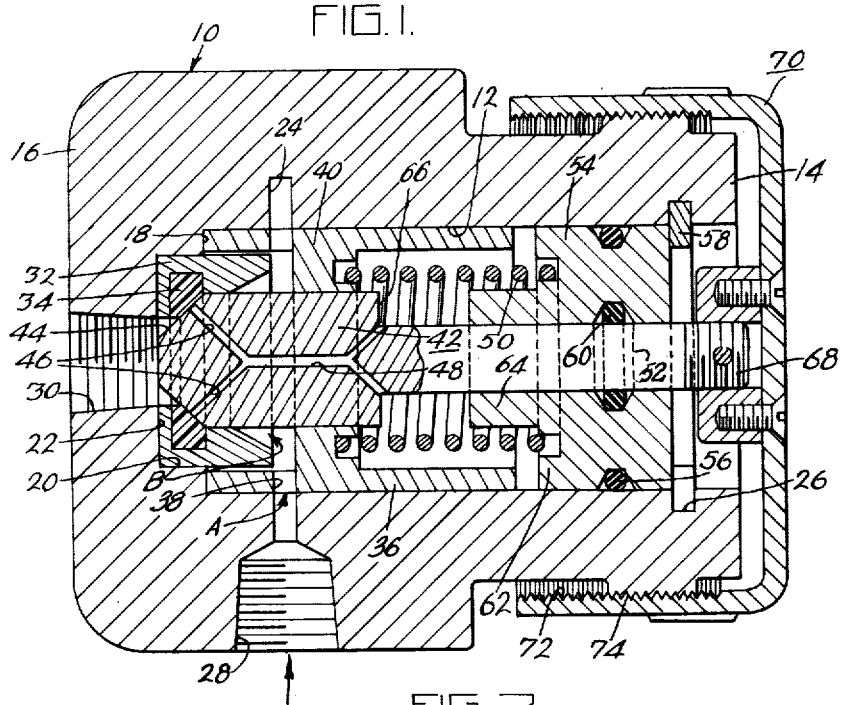
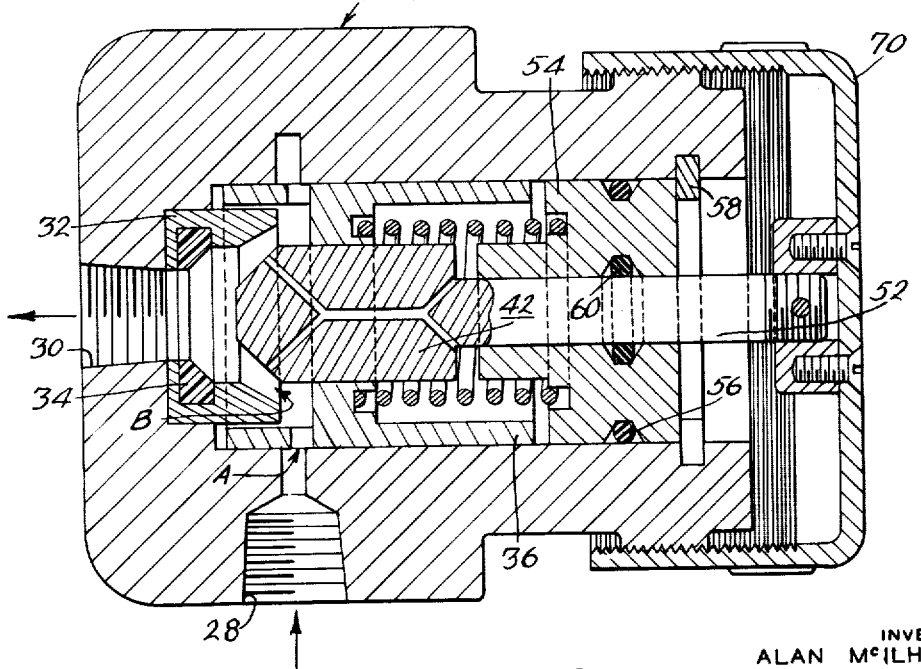
INVENTOR:
ALAN McILHENNY
BY *Howson & Howson*
ATTYS.

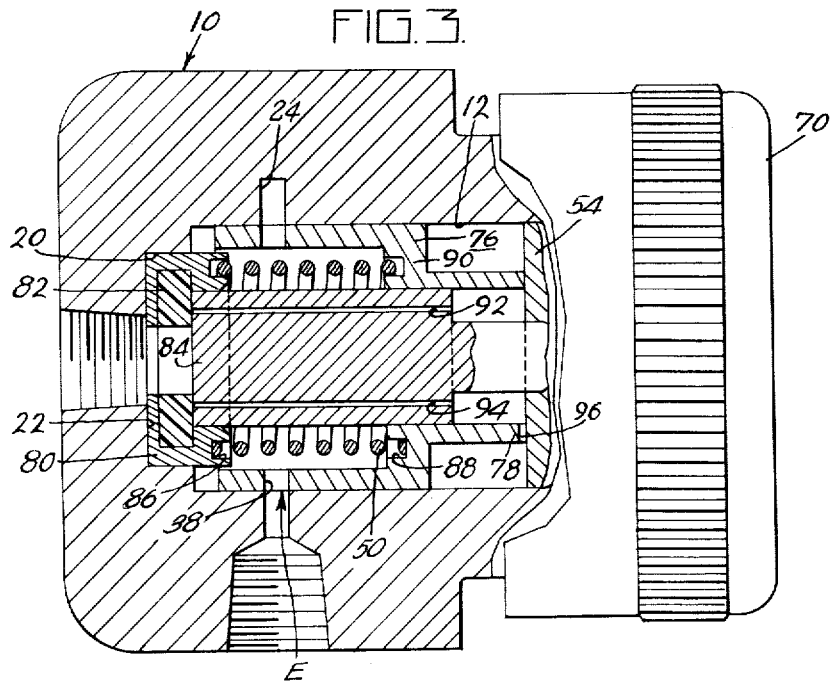
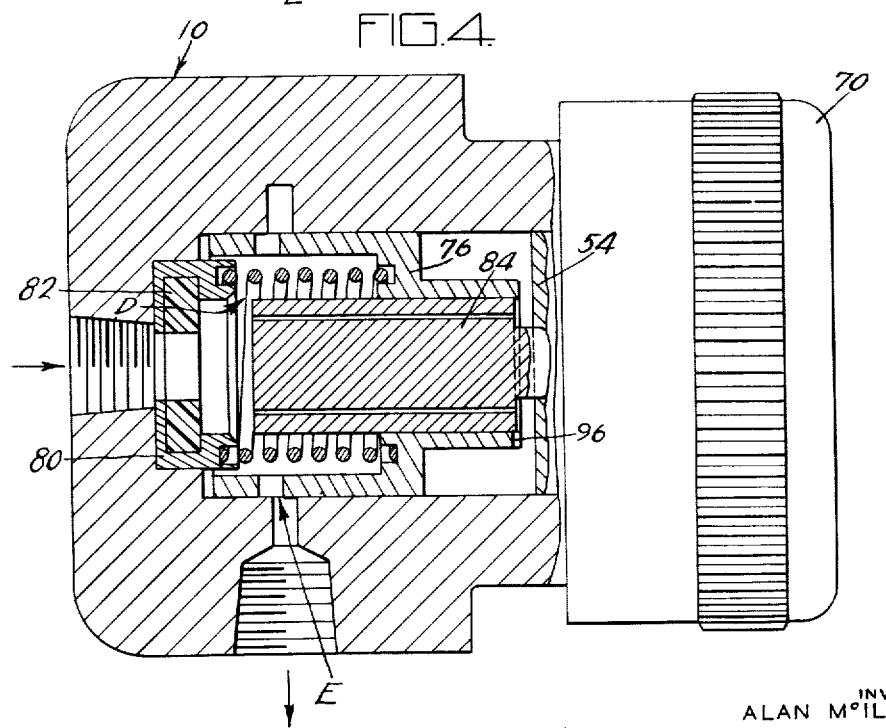

United States Patent Office

3,085,590
Patented Apr. 16, 1963

3,085,590
FLOW CONTROL VALVE
Alan McIlhenny, Andover Road, Newtown Square, Pa.
Filed Feb. 15, 1960, Ser. No. 8,635
5 Claims. (Cl. 137—501)

The present invention relates broadly to hydraulic valves and more specifically to a valve structure adapted for regulating the volume of fluid flow and for shutting off fluid flow without leakage.

An object of the invention is to provide a fluid control valve having a pressure compensator to regulate the flow of fluid so that a constant volume of fluid will pass through the valve regardless of pressure variations either upstream or downstream from the valve.

An additional object of the invention is to provide a pressure compensated flow control valve which is adjustable from zero flow to maximum flow during operation of the valve.

A further object of the invention is to provide a fully adjustable pressure compensated flow control valve of simple and economical construction, which has all the usual attributes of a globe valve.

Still another object of the invention is to provide a valve with hard metallic parts in regions used for throttling of flow and having soft resilient sealing surfaces for leak-tight shut-off which are protected from the eroding effects of throttling service.

An additional object of the invention is to provide a valve which, when opened to an operating position, controls the volume of fluid flowing in one direction only through the valve, and permits reverse free flow in the other direction with little pressure drop.

A further object of the invention is to provide a valve which does not require a drain to remove accumulated leakage fluid from the internal regions of the valve.

A still further object of the invention is to incorporate means in such a valve to provide a dashpot action which eliminates undesirable oscillation of the pressure compensating mechanism.

A still further object of the invention is to provide a valve of the type described with pressure compensating mechanism of a minimum size and weight so as to be capable of rapid acceleration in response to pressure changes in the system incorporating the valve.

A further object of the invention is to provide a valve of the type described wherein the path of travel of the moving pressure compensating components is minimized, thus maximizing the speed of response of the valve to changes in the system pressure and minimizing the effect of spring rate on the regulation of the system.

Other and further objects and advantages will be more readily apparent from the following detailed description of embodiments thereof, when taken together with the accompanying drawings in which:

FIG. 1 is a sectional view of an embodiment of the present invention showing the valve in closed position;

FIG. 2 is a sectional view of an embodiment of FIG. 1, showing the valve in an open operating position;

FIG. 3 is a partial sectional view of the modified embodiment of the present invention shown in closed position; and FIG. 4 is a partial sectional view of the embodiment of FIG. 3 showing the valve in an open operating position.

As shown in FIGS. 1 and 2 of the drawings, the invention includes a valve body 10, the external shape of which may be varied to suit a particular application of the invention. A generally cylindrical external shape is preferred since it allows ease in machining, a light-weight body, and a minimum cost of materials. The valve embodiments shown are of an efficiently compact design, the function of which will be more specifically described hereinafter.

The valve body 10 has an interior main valve bore 12 having smooth, straight walls of a uniform cross-section. The bore 12 extends through one end 14 of the valve body 10. This bore does not extend to the opposite end 16 of the valve body, but terminates at a shoulder 18, the surface of which is in a plane vertical to the axis of bore 12. Beyond shoulder 18 there is an ancillary bore 20 coaxial with bore 12, and extending from it to a terminating perpendicular face 22.

Interrupting the smooth walls of the main bore 12 are two slots; an intake slot 24 is located near the shoulder 18, and a retaining slot 26 is situated near the end 14 of the valve body.

An inlet port 28 is located in the side wall of valve body 10 and connects with the inlet slot 24. An outlet port 30 extends from end 16 of the valve body to the end face 22 of the ancillary bore 20. Seated in the ancillary bore 20 of the valve body 10 is a metering insert 32 which is channeled to receive a resilient sealing ring 34.

A hollow throttling piston 36 is slidably located within the main valve bore 12, the walls of said piston having slots 38 extending therethrough which are juxtaposed with intake slot 24 when the piston is in contact with the shoulder 18 which acts as a limit to piston travel in one direction. While slots have been shown and described for illustrative purposes, other types of fluid passageways can be used. Extending interiorly of the piston 36 is a peripheral wall 40. Positioned slidably through said peripheral wall, in close-fitting relation thereto, is a metering plug 42, shaped at one end to coact in a sealing fit with metering insert 32 and resilient sealing ring 34 when positioned in abutting relationship to said ring. The angled metering face 44 of plug 42 in a pressure sensing capacity has sensing passages 46 which in conjunction with the through passage 48 permit fluid passage from one side of wall 40 to the other.

A piston spring 50 engages at one end with wall 40 of piston 36, surrounds stem 52 of plug 42, and bears at the opposite end on plug 54 in the rearward end of bore 12. Plug 54 is provided with a resilient sealing washer 56 and is held in place by retaining ring 58 positioned in slot 26 of the main valve bore 12. Plug 54 is constructed so as to provide a substantial bearing passage for stem 52 which passes therethrough. A resilient stem seal 60 is provided to prevent fluid leakage.

Plug 54 has a shoulder 62 which acts as a second stop restricting travel of piston 36, combining with shoulder 18 of the valve body 10 previously described to limit the path of piston travel. A neck portion 64 of plug 54 provides a guide for spring 50 and additionally provides a stop for metering plug 42 by contact with shoulder 66 of this plug.

Stem 52 extends through plug 54 and the protruding end 68 may be provided with some type of lever or wheel arrangement which permits accurate control of stem axial location and motion. In the embodiments shown, an adjusting wheel 70 is attached to stem 52, the wheel having a threaded flange 72 which coacts with a similarly threaded portion 74 of valve body 10.

The foregoing description encompasses the mechanical and structural details of the present flow control valve. It will be noted from the following discussion of operation of the valve that this construction lends itself to a highly improved mode of operation and desirable structural features. As pointed out hereinbefore, FIG. 1 shows the valve in closed position with the metering face 44 in drop-tight sealing engagement with the resilient sealing ring 34. The drop-tight characteristic results from the nature of the sealing ring and contact therewith by the metering face. When the metering plug has been moved into the closed position by operation or manipulation of the adjusting wheel 70, flow into or out of the valve is cut off. Under this condition, the spring 50 will move the throttling piston 36 to the position shown in FIG. 1 and since the pressure sensing passages are cut off, this position of equilibrium will maintain.

When the valve is opened to any set position such for example as shown in FIG. 2, by manipulation of the hand wheel 70, the metering plug 42 is withdrawn to break the engagement between the metering faces 44 and sealing ring 34. Flow can then take place through intake port 28 passing through the slots 38 in throttling piston 36 and thence outwardly through outlet port 30. The inlet bore or slot 38 coacts with the slot in the valve body leading from inlet port 28 to serve as a throttling orifice at point A and a metering orifice is formed at point B between the corner of the metering plug 42 and the inner conical shaped surface of the metering insert 32. Fluid introduced into the valve is accordingly throttled and a pressure differential occurs across the metering orifice, with the low pressure side in the region of the pressure sensing passages 46 so that fluid pressure can be transmitted to the interior of the piston wherein the spring is located. In this construction, the pressure sensing passages 46 are favorably placed as regards location, and are used to sense the low pressure on the downstream side of the metering orifice. These are used to transmit this pressure to the low pressure side of the throttling piston by way of the through passage 48 and in behind the peripheral wall 40. Pressures will, accordingly, act on both sides of the piston and in conjunction with the spring operation will move the piston to a position of equilibrium for the adjusted output flow. The arrangement and relationship of parts will be noted from FIG. 2 where this position of equilibrium has been reached with the slots in the valve body and piston out of alignment, to give the proper throttling effect. It will also be noted that the portions of the valve structure contacted by and on the high pressure side of the fluid inlet, are of hard durable material and not affected by possible eroding effects of throttling service. At the same time, the soft, resilient sealing surfaces permit a leak-tight shut-off and which surfaces are not subject to an eroding effect.

The pressure sensing holes in this construction are located almost at the point of maximum constriction in the metering orifice, which is a point of minimum pressure, even lower pressure than will exist a short distance further downstream where some of the velocity energy has been converted back into pressure. This construction provides the Venturi effect for sensing of pressure drop for maximum effect and the least over-all pressure loss.

The piston contemplated in this arrangement is of minimum size and weight so that with the spring of reasonable size producing a pressure drop in the valve of an acceptable amount, the combination of the spring and piston shall be capable of rapid acceleration in response to pressure changes in the system incorporating the valve.

It is also to be noted that the valve is provided with a slot in the body to throttle flow through the valve, and which slot is of minimum width to provide a full range of throttling action with a minimum amount of travel of the piston, which travel of the piston is minimized to improve the speed of response of the valve to changes in the system pressure and to minimize the effect of spring rate on the regulation of the system. The narrow metering slot provides for sharp cut-off and the stiff spring used has a high natural frequency. If desired, the hollow piston may be damped by a dashpot action by making passages 46, 48 of small diameter.

An embodiment of the invention is shown in FIGS. 3 and 4 of the drawings having many of the same characteristics as defined in connection with the preceding embodiment and like parts will be given like reference characters in the following description. In this embodiment of the invention, the controlled direction of flow has been reversed and the metering or measuring of the flow takes place before the throttling, opposite to the sequence employed in the preceding embodiment. FIG. 3 shows this embodiment of the valve in closed operation, preventing flow therethrough, and FIG. 4 shows a predetermined and selected open position of the valve. The valve body 10 is again provided with a main valve bore 12 terminating in an ancillary bore 20. The throttling piston 76 inserted in the bore 12 is of slightly different configuration having a decreased end portion 78 adapted for engagement at its end against a stop and sealing plug 54. A cup shaped insert 80 serving as a metering or measuring insert is seated in ancillary bore 20. A resilient sealing ring 82 is operatively seated in the insert 80 and acts in the same manner as the insert 34 in the preceding embodiment for sealing or shutting off the valve. A metering plug 84 is slidably mounted within the throttling piston 76 around which spring 50 is mounted which engages at one end in groove 86 in the internal face of cup shaped insert 80, and at the other end in a groove 88 in peripheral wall 90 of throttling piston 76. This arrangement of the spring urges the throttling piston to the right as seen in FIGS. 3 and 4 which is contrary to that shown in FIGS. 1 and 2. Pressure sensing passages 92, 94 extend longitudinally through the body of the metering plug and thus they now sense a higher pressure and conduct it to the high pressure side of the throttling sleeve valve or hollow piston 76. This change in the shape of the end of the metering plug and its coacting resilient seat is provided in order to avoid the Venturi effect referred to. When sensing a higher pressure it is well to keep as far from the metering constriction as possible, which in this embodiment is indicated at D, and the throttling occurs at E. This is a reversal of the sequence of these functions from that shown in the embodiment of FIGS. 1 and 2. Aside from the changes in the shape of the metering plug and the throttling piston, it will be noted that the throttling holes or openings 38 in the throttling piston are now on the other side of the slot 24 in the valve body 10 when the device is in operation as shown in FIG. 4. These holes or openings, however, still line up with the slot when the valve is tight shut and there is no pressure differential across the hollow piston.

Other than the foregoing discussed changes, the structure and operation of the two embodiments of the valve give substantially the same end results, in that they combine certain features of known globe valve constructions in combination with pressure compensated flow control having a drop-tight shut-off feature wherein the arrangement is such, as regards construction, that damage to the soft resilient seal is prevented.

Manifestly minor changes in details of construction can be effected within the spirit and scope of the invention without departing from the appended claims.

I claim:

1. In a fluid flow control valve, a valve body having a bore therein and a fluid inlet and a fluid output port, a fluid passage in said valve body interposed between one said port and said bore, a hollow throttling piston movably mounted in said bore, said piston having a fluid passage therein communicable with said fluid passage in said body in varying amounts for variably throttling flow of fluid from the inlet to output ports, a valve seat adjacent said output port, a metering plug slidably mounted concentrically within said piston in fluid-tight relationship and operable to prevent flow through said valve by coaction with said valve seat, pressure sensing means in said plug opening into said bore at opposite ends of said plug and transmitting pressure from adjacent said output port to the end of said piston removed from the output port, a metering insert in said body adjacent one said port and having a conical surface open into said bore, said valve seat including a resilient sealing ring mounted in said insert and remote from said conical surface, said metering plug having an end face thereof engageable with said sealing ring for flow shut-off and operable in conjunction with said conical surface for metering flow through said valve, and spring means associated with said piston biassing it toward a full open communication relationship of said fluid passages.

2. In a fluid flow control valve as claimed in claim 1, said pressure sensing means comprising passages extending through said metering plug and open at said end face thereof, engagement of said end face with said sealing ring closing said passageways against pressure transmission therethrough.

3. In a fluid flow control valve, a valve body having a chamber therein, fluid inlet and outlet ports communicating with said chamber, differential pressure actuating throttling means in said chamber having one face disposed to pressure in said chamber, means biasing said throttling means against said differential pressure, fluid flow metering means between one of said ports and said throttling means and mounted concentrically within said throttling means, said fluid flow metering means being operable to regulate the rate of flow through said valve, a metering insert in said body adjacent one said port and having a conical surface open into said chamber, resilient seal means including a resilient sealing ring mounted in said insert and remote from said conical surface, said fluid flow metering means including a surface engageable with said sealing ring for flow shut-off, fluid pressure transmitting conduit means to transmit pressure from between said metering means and said metering insert to an opposite face of said throttling means, said fluid pressure transmitting conduit means being so disposed with respect to said fluid flow metering means and said resilient seal means, as to prevent leakage therethrough upon fluid shut-off of the metering means.

4. In a fluid flow control valve as claimed in claim 3, said fluid pressure transmitting conduit means being in said metering means and opening at said surface engageable with said sealing ring, engagement of said surface with said sealing ring closing said conduit means against pressure differential transmission.

5. In a fluid flow control valve as claimed in claim 4, said sealing ring being so disposed with respect to fluid flow through said valve as to be protected from eroding effects of throttling service of said valve.

References Cited in the file of this patent
UNITED STATES PATENTS

| | | |
|---|---|---|
| 2,570,317 | Busson | Oct. 9, 1951 |
| 2,608,209 | Bryant | Aug. 26, 1952 |
| 2,924,421 | Pohndorf | Feb. 9, 1960 |
| 2,973,778 | Baker | Mar. 7, 1961 |

UNITED STATES PATENT OFFICE
CERTIFICATE OF CORRECTION

Patent No. 3,085,590                                          April 16, 1963

Alan McIlhenny

It is hereby certified that error appears in the above numbered patent requiring correction and that the said Letters Patent should read as corrected below.

Column 1, line 23, for "attribuates" read -- attributes --; line 59, for "an" read -- the --.

Signed and sealed this 29th day of October 1963.

(SEAL)
Attest:

ERNEST W. SWIDER                              EDWIN L. REYNOLDS

Attesting Officer                              Acting     Commissioner of Patents